United States Patent
Green

(10) Patent No.: US 6,893,524 B2
(45) Date of Patent: May 17, 2005

(54) METHOD AND APPARATUS FOR MANUFACTURING A REINFORCEMENT

(75) Inventor: David E. Green, Aurora, OH (US)

(73) Assignee: Glastic Corporation, Cleveland, OH (US)

(*) Notice: Subject to any disclaimer, the term of this patent is extended or adjusted under 35 U.S.C. 154(b) by 103 days.

(21) Appl. No.: 10/350,465

(22) Filed: Jan. 24, 2003

(65) Prior Publication Data

US 2004/0144478 A1 Jul. 29, 2004

(51) Int. Cl.[7] .................. B32B 31/12; B32B 31/22; B32B 31/26; B32B 31/28
(52) U.S. Cl. ................ 156/180; 156/229; 156/272.2; 156/275.5; 156/275.7; 156/196
(58) Field of Search .............................. 156/180, 229, 156/272.2, 275.5, 275.7, 196

(56) References Cited

U.S. PATENT DOCUMENTS

| | | |
|---|---|---|
| 2,536,183 A | 1/1951 | Jamieson |
| 3,413,188 A | 11/1968 | Allen |
| 3,890,077 A | 6/1975 | Holman |
| 3,895,896 A | 7/1975 | White et al. |
| 4,066,805 A * | 1/1978 | Shenk .................. 427/226 |
| 4,108,351 A | 8/1978 | Hough |
| 4,242,406 A | 12/1980 | El Bouhnini et al. |
| 4,312,162 A | 1/1982 | Medney |
| 4,474,920 A * | 10/1984 | Kyminas et al. ............ 524/386 |
| 4,495,020 A | 1/1985 | Nakabayashi et al. |
| 4,615,163 A | 10/1986 | Curtis et al. |
| 4,861,621 A | 8/1989 | Kanzaki |
| 4,965,973 A | 10/1990 | Engebretsen |
| 5,000,808 A | 3/1991 | Deviney |
| 5,006,390 A | 4/1991 | Kavesh et al. |
| 5,026,593 A | 6/1991 | O'Brien |
| 5,057,353 A * | 10/1991 | Maranci et al. ............ 428/147 |
| 5,061,545 A | 10/1991 | Li et al. |
| 5,130,184 A | 7/1992 | Ellis |
| 5,135,793 A | 8/1992 | Socha |
| 5,153,058 A | 10/1992 | Hall et al. |
| 5,198,281 A * | 3/1993 | Muzzy et al. ............... 428/102 |
| 5,264,060 A | 11/1993 | Lambing et al. |
| 5,286,320 A | 2/1994 | McGrath et al. |
| 5,332,626 A | 7/1994 | Conston et al. |
| 5,344,689 A * | 9/1994 | Ide et al. .................... 428/114 |
| 5,362,545 A | 11/1994 | Tingley |

(Continued)

FOREIGN PATENT DOCUMENTS

| | | |
|---|---|---|
| EP | 0 285 376 | 5/1988 |
| JP | 4149346 A | 5/1992 |
| WO | WO9608366 A1 | 3/1996 |

OTHER PUBLICATIONS

Arnold et al., "A Simple, Low–Cost, Tensioning Device for Pultruding Composite Materials"; 32nd International SAMPE Symposium, Apr. 6–9, 1987.

(Continued)

*Primary Examiner*—Sam Chuan Yao
(74) *Attorney, Agent, or Firm*—Harness, Dickey & Pierce, PLC

(57) ABSTRACT

A method includes wetting fibers with a resin capable of being cured by at least two different cure treatments. At least partially curing the resin by subjecting the resin to a first cure treatment and at least partially curing the resin by subjecting the resin to a second cure treatment. A plurality of fibers are located adjacent each other so that a plurality of valleys are formed between the plurality of fibers along an outer side of the reinforcement. The resin is cured to retain the valleys in the outer side of the reinforcement. The outer side of the reinforcement is adhered to the structural member. An apparatus including a fiber locating mechanism adapted to retain the peaks and valleys during curing of the resin without rigidly confining the outer side of the reinforcement.

24 Claims, 3 Drawing Sheets

U.S. PATENT DOCUMENTS

| | | | |
|---|---|---|---|
| 5,374,385 A | | 12/1994 | Binse et al. |
| 5,413,847 A | * | 5/1995 | Kishi et al. .................... 442/69 |
| 5,424,388 A | | 6/1995 | Chen et al. |
| 5,441,792 A | * | 8/1995 | Brown ........................ 428/170 |
| 5,456,781 A | | 10/1995 | Tingley |
| 5,498,460 A | | 3/1996 | Tingley |
| 5,547,729 A | | 8/1996 | Tingley |
| 5,556,496 A | | 9/1996 | Sumerak |
| 5,565,257 A | | 10/1996 | Tingley |
| 5,641,553 A | | 6/1997 | Tingley |
| 5,647,171 A | | 7/1997 | Wirsing et al. |
| 5,648,138 A | | 7/1997 | Tingley |
| 5,700,417 A | | 12/1997 | Fernyhough et al. |
| 5,721,036 A | | 2/1998 | Tingley |
| 5,736,220 A | | 4/1998 | Tingley |
| 5,741,384 A | | 4/1998 | Pfeiffer et al. |
| 5,744,228 A | | 4/1998 | Tingley |
| 5,747,151 A | | 5/1998 | Tingley |
| 5,783,013 A | | 7/1998 | Beckman et al. |
| 5,885,685 A | | 3/1999 | Tingley |
| 5,891,550 A | | 4/1999 | Tingley |
| 5,910,352 A | | 6/1999 | Tingley |
| 5,935,368 A | | 8/1999 | Tingley |
| 5,974,760 A | | 11/1999 | Tingley |
| 6,037,049 A | | 3/2000 | Tingley |
| 6,051,301 A | | 4/2000 | Tingley |
| 6,173,550 B1 | | 1/2001 | Tingley |

OTHER PUBLICATIONS

Dagher et al, "Effect of FRP Reinforcement on Low Grade Eastern Hemlock Glulams", Proceedings—National Conference on Wood Transportation Structures, Madison, WI, Oct. 23–25, 1996.

Rowlands et al., "Fiber–Reinforced Wood Composites", Wood and Fiber Science, vol. 18(1), Jan. 1986, pp. 40–57.

Tingley, "Predicting Strength Criteria for Kevlar and Fiberglass Reinforced Plastic (KRP & FRP) Glued Laminated Beams", Proceedings of the Second Pacific Timber Engineering Conference, vol. 2, 1989, pp. 301–304.

Tingley, "Reinforced Glued–Laminated Wood Beams"; 96 page thesis accepted by the University of Brunswick (Canada), Nov., 1987.

Tingley, "Reinforced Glued–Laminated Wood Beams"; Proceedings of the 1988 International Conference on Timber Engineering, vol. 1, Sep. 19–22, pp. 422–427.

Triantafillou et al., "Nonprestressed FRP Sheets as External Reinforcement of Wood Members", Materials Performance and Prevention of Deficiencies and Failures, Aug. 10–12, 1992.

Triantafillou et al., "Prestressed FRP Sheets as External Reinforcement of Wood Members", Journal of Structural Engineering, May 5, 1992.

van de Kuilen; "Theoretical and Experimental Research on Glass Firbre Reinforced Laminated Timber Beams"; Proceedings of the 1991 International Timber Engineering Conference, vol. 3; Sep. 2–5, 1991.

Wood Design Focus, "A Newsletter of Contemporary Wood Engineering", vol. 4, No. 2, Summer 1993, R.J. Leichti, Editor.

* cited by examiner

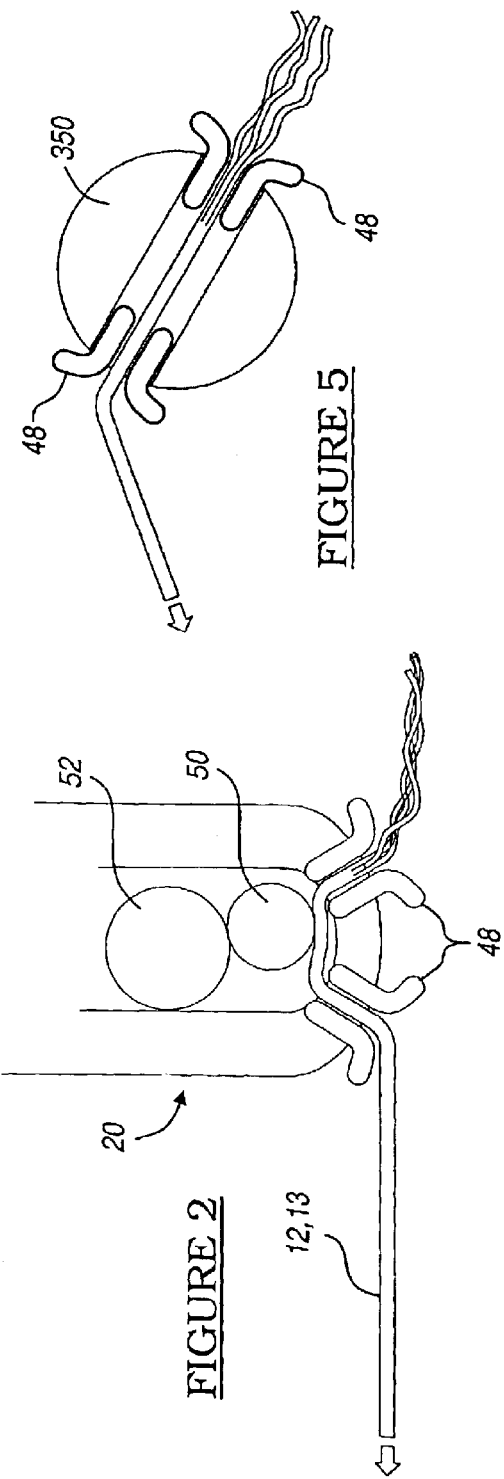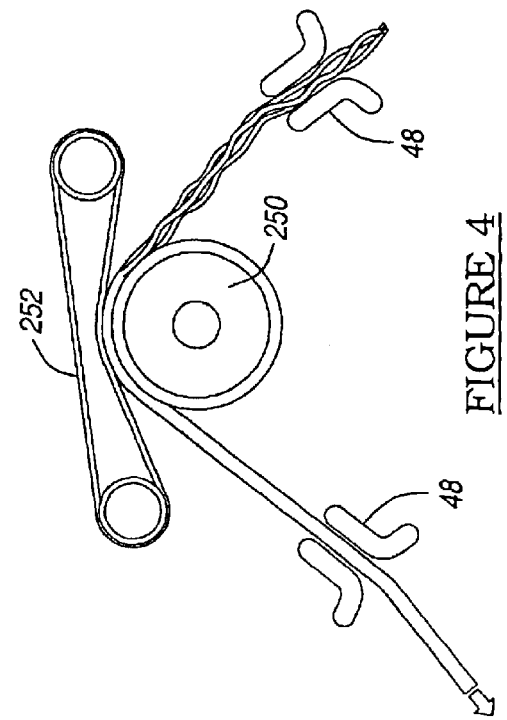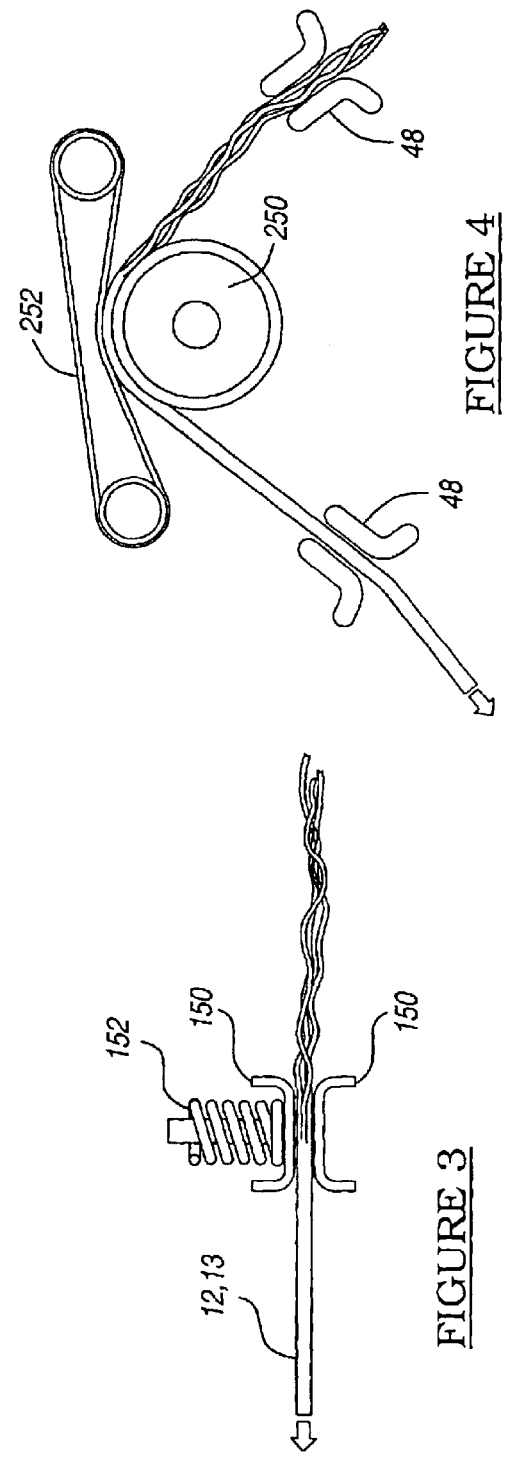

METHOD AND APPARATUS FOR MANUFACTURING A REINFORCEMENT

FIELD OF THE INVENTION

The present invention relates to composite fiber and resin reinforcements for structural members; and more particularly, to methods of manufacturing such fiber reinforcements.

BACKGROUND OF THE INVENTION

Reinforcements for structural members have been manufactured using pultrusion processes. This process generally involves wetting fibers with resin and pulling them through a mold where the resin is cured as a result of heating the resin. The mold tends to create relatively smooth surfaces on the sides of the reinforcement although some recesses are often present. Exemplary pultrusion processes are disclosed, for example, in the following patents: U.S. Pat. No. 3,895,896 which issued to White et al. on Jul. 22, 1975; U.S. Pat. No. 5,286,320 which issued to McGrath et al. on Feb. 15, 1994; U.S. Pat. No. 5,374,385 which issued to Binse et al. on Dec. 20, 1994; U.S. Pat. No. 5,424,388 which issued to Chen et al. on Jun. 13, 1995; U.S. Pat. No. 5,556,496 which issued to Sumerak on Sep. 17, 1996; U.S. Pat. No. 5,741,384 which issued to Pfeiffer et al. on Apr. 21, 1998; and U.S. Pat. No. 5,783,013 which issued to Beckman et al. on Jul. 21, 1998.

Another type of pultrusion process has involved spreading resin on a film such as Mylar, adding fiber materials, and then adding a top cover film to form an envelope that essentially becomes a flexible mold. This sandwich is shaped by tension and mechanical forms and is then pulled through an oven to cure the sandwich in the form that is desired.

A third variation of pultrusion provides for the fibers to be placed under tension, saturated with photo-initiated resin, pulled through a series of sized dies to form the fibers into a round bundle, and then exposed to high intensity ultraviolet light where curing is initiated. A surface coating is then applied and cured to provide a desired resin rich surface. This process has been used in forming strengthening members of fiber optic cables. Exemplary variations of this process are disclosed in U.S. Pat. No. 4,861,621 which issued to Kanzaki on Aug. 29, 1989; and U.S. Pat. No. 5,700,417 which issued to Fernyhough et al. on Dec. 23, 1997.

A forth variation of pultrusion provides for the fibers to be placed under tension, saturated with thermo-reactive resin, pulled through a series of sized dies to form the fibers into a round bundle while exposed to elevated temperatures such as found in an oven. This process has been used in the making of fishing rods and also adapted for fibreoptic cable members.

SUMMARY OF THE INVENTION

In accordance with one aspect of the present invention method of manufacturing a reinforcement for a structural member includes wetting fibers with a resin capable of being cured by at least two different cure treatments. At least partially curing the resin by subjecting the resin to a first cure treatment and at least partially curing the resin by subjecting the resin to a second cure treatment.

In accordance with another aspect of the present invention a method of manufacturing a reinforced structural member comprising a fiber and resin reinforcement and a structural member is provided. The method includes wetting a plurality of fibers with a curable resin. A plurality of fibers are located adjacent each other so that a plurality of valleys are formed between the plurality of fibers along an outer side of the reinforcement. The resin is cured to retain the valleys in the outer side of the reinforcement. The outer side of the reinforcement is adhered to the structural member.

In accordance with yet another aspect of the present invention an apparatus for manufacturing a reinforcement for a structural member includes a fiber wetting station adapted to contact a plurality of fibers with a resin. A fiber locating mechanism is adapted to locate the plurality of fibers adjacent each other so that a plurality of valleys are formed between the plurality of fibers along an outer side of the reinforcement and so that a plurality of peaks associated with the fibers are formed. The fiber locating mechanism is further adapted to retain the peaks and valleys during curing of the resin without rigidly confining the outer side of the reinforcement. A resin curing station is adapted to irradiate the outer side of the reinforcement to at least partially cure the resin.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a schematic illustration of an alternative preferred tensioning mechanism;

FIG. 3 is a schematic illustration of an alternative preferred tensioning mechanism;

FIG. 4 is a schematic illustration of an alternative preferred tensioning mechanism;

FIG. 5 is a schematic illustration of an alternative preferred tensioning mechanism;

DETAILED DESCRIPTION OF THE PREFERRED EMBODIMENTS

The following description of the preferred embodiment(s) is merely exemplary in nature and is in no way intended to limit the invention, its application, or uses.

Figure 1:
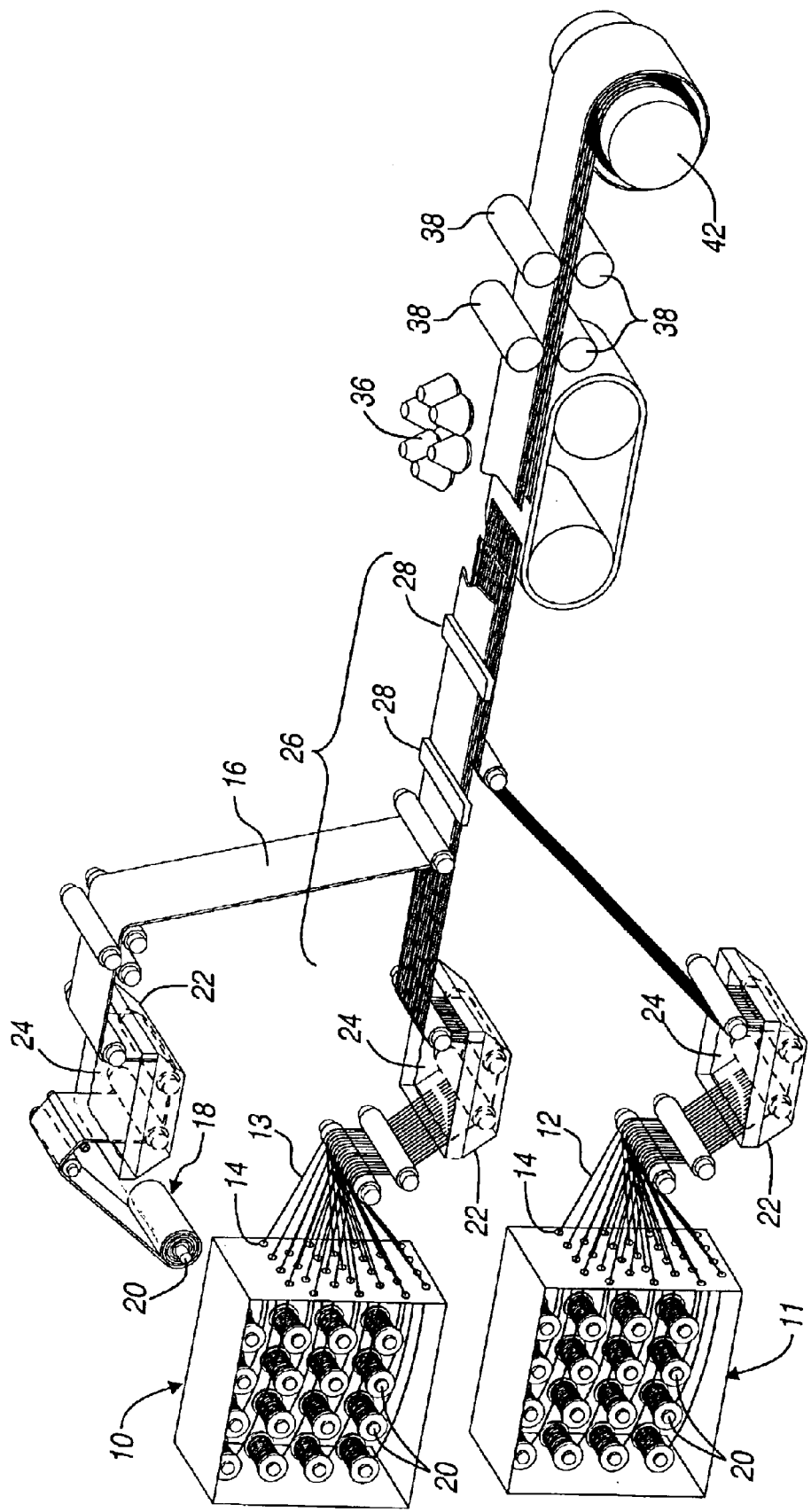
FIG. 1 is a schematic illustration of an apparatus according to the invention for manufacturing a reinforcement for a structural member.

Referring to FIG. 1, a schematic representation of a preferred embodiment of an apparatus of the present invention is illustrated. A plurality of creels 10, 11 are provided from which various fibers 12, 13 are supplied. The first creel 10 provides a supply of first fibers 12 and the second creel 11 provides a supply of second fibers 13 made from a different material. The creels 10, 11 typically include ceramic eyelets 14 through which the fibers 12, 13 pass. In addition to the creels 10, 11 supplying fibers 12, 13, fibers are provided in the form of a thin veil 16 of non-woven fibers from a supply roll 18. In this case the non-woven veil 16 is made of a plurality of swirled fibers. Each of the fibers 12, 13, 16 being supplied to the process are preferably tensioned by tensioning device 20. In this embodiment, the tensioning device 20 is associated with the creels 10, 11 and the supply roll 18. The tensioning device 20 is provided by brake wheels 20 which resist the unwinding of the various fibers 12, 13, 16. It is preferred that the tensioning device 20 be adapted to create substantially the same amount of tension in each of the longitudinal fibers 12, 13 of the finished reinforcement.

Referring to FIGS. 2–5, various alternative preferred tensioning device 20 embodiments are illustrated. These enable the tensioning of the fibers 12, 13 to be controlled to adjust the tension of the fibers 12. These devices may also be used to tension the nylon veil 16, although for simplicity they are described herein in terms of fibers 12, 13. Referring to FIG. 2, the fibers 12, 13 pass through a pair of non-aligned ceramic eyelets. A bearing roller 50 and weight ball 52 provide tension in the fiber 12, 13 as it is pulled through the eyelets 48. Referring to FIG. 3, a biasing spring 152 pushes against pressure disks 150 to provide a compressive force on the fiber 12, 13. Referring to FIG. 4, a rubber belt 252 and brake controlled sheave 250 compress the fiber 12, 13 to create tension in the fiber 12, 13. Referring to FIG. 5, a pair of ceramic eyelets 48 are moveable on a pivot member 350 to various angles to adjust the amount of tension in the fibers 12, 13.

Returning to FIG. 1, the fibers 12, 13 may be rovings, tows, yarn, other fiber bundles or even individual filaments. In addition, fibers 16 are preferably provided to provide strength in the cross direction through the use of a mat, veil, scrim, tape, woven fibers, sewn fibers, and bonded non-wovens. As described above, this embodiment includes fibers 12 of a first material and fibers 13 of a second material, and a synthetic veil 16. For this specific preferred embodiment, the first fibers 12 are aramid fibers 13, the second fibers are fiberglass and the synthetic veil 16 is made of swirled nylon fibers.

A broad range of fiber materials may be used. Preferred fibers 12, 13, 16 are made of materials selected from fiberglass, aramid, carbon, nylon, polyester, polyethylene, ceramic, steel, metal alloys, and boron. The first fibers 12 and the cross-directional fibers 16 which are at the outer sides of the reinforcement are preferably made of synthetic fibers; and more preferably, of aramid, nylon, polyester, and polyethylene. The second fibers 13 which are in the interior of the reinforcement are preferably made of mineral fibers; and more preferably, of fiberglass, carbon and ceramic.

The tensioned fibers 12, 13, 16 are passed through a resin bath 22 of liquid resin 24 to wet the fibers 12, 13, 16 with the resin 24. The resin 24 is capable of being cured by at least two different cure treatments. Potential cure treatments include photo-radiation, thermal radiation, electron beam radiation, and radio frequency (e.g., microwave) radiation. More preferably, the resin 24 is a thermosetting resin that is capable of being cured by photo-radiation and thermo-radiation. Examples of preferred resins 24 include polyesters, vinyl esters, epoxy, urethane, and mixtures thereof. More preferred resins 24 are acrylated epoxy and acrylated urethane.

The wet fibers 12, 13, 16 are then subjected to a forming mechanism 26. The forming mechanism 26 includes doctor blades 28 or other devices to remove excess resin 24 from the fibers 12, 13, 16. The forming mechanism 26 helps in appropriately locating the various fibers 12, 13, 16 relative to each other. In this embodiment, a layer of longitudinally aligned and tensioned first fibers 12 is created adjacent the top outer side. In addition, a central layer is created from longitudinally aligned and tensioned second fibers 13. Lastly, a layer adjacent the bottom outer side is formed from the resin wetted nylon veil 16. The fibers 13, 12, 16 of these three layers are all located adjacent each other with liquid resin material 24 generally filling the space between the fibers 12, 13, 16.

After passing through the forming mechanism 26 the fibers 12, 13, 16 can have various tendencies to spring away from each other. This is caused by the apparatus design and/or the fiber materials. In addition, the fiber 12, 13, 16 to resin 24 ratio is relatively high. Preferably the fiber 12, 13, 16 to resin 24 ratio is from about 30% to about 70% by volume; more preferably, from about 50% to about 70%; and even more preferably, from about 55% to about 65%.

Figures 6, 7:
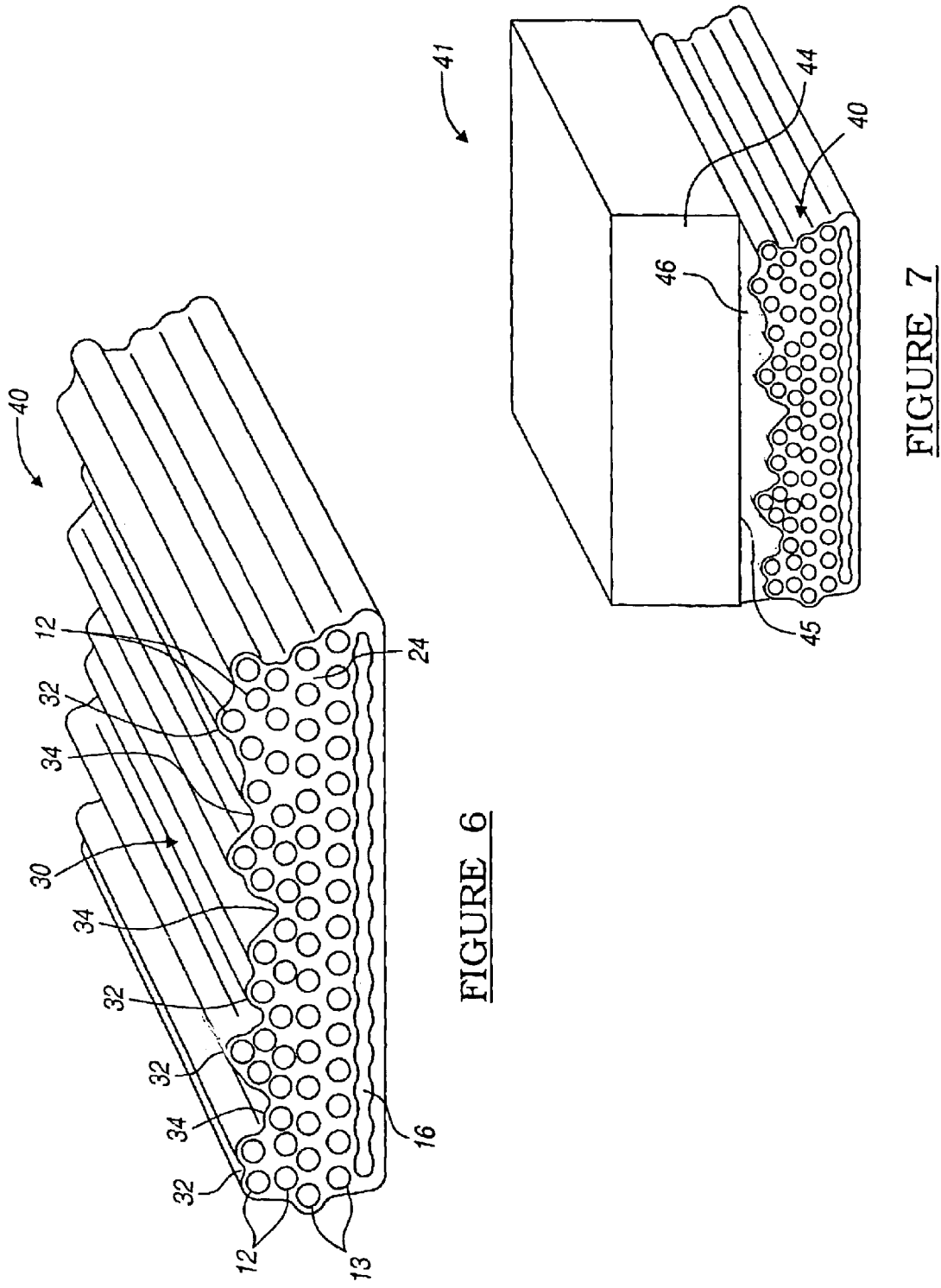
FIG. 6 is an enlarged fragmentary perspective view of a particularly preferred embodiment of a reinforcement resulting from the method of the present invention.
FIG. 7 is an enlarged cross-sectional view of a preferred reinforced structural member.

Referring to FIG. 6, the upper outer side 30 of the combined liquid resin 24 and fiber 12, 13, 16 composite has a series of peaks 32 and valleys 34. The peaks 32 are associated with the outermost fibers 12 which in this embodiment are coated with resin 24. The valleys 34 are created between at least two outermost fibers 12 causing adjacent peaks 32. Thus, the peaks 32 and valleys 34 of the top outer side 30 are elongated and oriented longitudinally along the web. Therefore, this outer side 30 has an undulating profile formed by the longitudinally oriented peaks 32 and valleys 34.

Returning to FIG. 1, the arranged resin coated fibers 12, 13, 16 are next subjected to curing while the top outer side 30 has the peaks 32 and valleys 34. Thus, the undulating surface caused by these peaks 32 and valleys 34 are present in the solid resin 24 and fiber 12, 13, 16 composite or reinforcement 40 which results from curing. The curing is preferably done while the resin is unconfined by a mold, die or film. In this embodiment, curing is accomplished by subjecting the located, tensioned, fibers 12, 13 which have been wetted with liquid resin 24 to ultra-violet (UV) radiation and thermal radiation. Thus, the resin 24 is subjected to two cure treatments. UV lamps 36 provide the source for both the UV radiation and thermal radiation. Since the aramid fibers 12 of this embodiment are not transparent, they create shadows from the UV lamps 36. The additional use of heat provides for effective curing throughout the resin 24, even in the UV light shadows within the resin 24.

The heat generated by the UV lamps 36 is sufficient in this embodiment to provide the necessary thermal radiation. Alternatively, additional heat sources are included. The combination of the UV radiation and heat from the lamps 36 is sufficient to fully catalyze the resin. These additional heat sources are preferably selected from infrared heaters, radio frequency (e.g., microwave) heaters, or other devices to provide thermal radiation or convection. Preferably, the resin 24 has a catalyzation that is thermo reactive at a temperature which is at least about 200° F.; more preferably at least about 250° F.; and even more preferably, at least about 275° F. Such preferred catalyzation temperatures provides a more stable resin system at room temperature or at somewhat elevated temperatures. Since the resin viscosity is dependant on the temperature, this will allow for slightly elevated resin temperature to be used to attain the most suitable viscosity for processing.

Pairs of wheels 38 operate as puller clamps to pull the cured composite 40 out of the curing station. Alternative puller clamps may include caterpillar treads or another clamp and pull source. In this embodiment, the wheels 38 are driven by a drive mechanism (not seen). The wheel pairs 38 provide the force which works in combination with the tensioning device 20 to cause tension on the fibers 12, 13, 16 throughout the curing process. Thus, the fibers 12, 13 of this embodiment are in longitudinal tension while the resin is cured. The puller clamps 38 feed the cured composite 40 to a roll-up station for storing and subsequent processing plain text. Alternatively, the cured reinforcement is delivered to a cutting station which cuts the reinforcements into desired sizes and shapes.

Referring to FIG. 7, a preferred embodiment of a reinforcement 40 according to the present invention is illustrated. The reinforcement 40 which results from the above is preferably subsequently adhered to a structural member 44. The adhesive 46 flows into the valleys 34 of the reinforcement 40 and bonds to the valleys 34. In addition, the reinforcement 40 is preferably adapted to permit the adhesive 46 to penetrate completely through the overall thickness of the reinforcement 40. Thus, the resin 24 may include pores or cracks in the resin 24 may be encouraged or permitted, for example, by bending the reinforcement 40.

By bonding to the valleys 34 and/or penetrating completely through the overall thickness of the reinforcement 40 the adhesive 46 creates a particularly strong mechanical bond between the reinforcement 40 and the wood structural member 44. The adhesive 46 may be any type of adhesive suitable for attaching the reinforcement 40 to the structural member 44.

Many modifications can be made to the above described embodiments. For example, in one alternative the resin may be poured over the already located and tensioned fibers. In another alternative, the fibers may be placed on top of a pool of resin. As another alternative, a veil might be placed on the top side to create the peaks and valleys in association with the swirled fibers of the veil. Thus, the peaks and valleys would not have such a highly elongated shape as that illustrated above. As yet another alternative, the various fibers may be mixed together rather than oriented in layers.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of manufacturing a reinforcement for a structural member comprising a fiber and resin reinforcement and a structural member, the method comprising:

wetting the fibers with a curable resin;

longitudinally aligning a plurality of fibers adjacent each other so that a plurality of valleys are formed between the plurality of fibers along an outer side of the reinforcement;

thereafter curing the resin to retain the valley in the outer side of the fiber and resin reinforcement and to provide a side of the fiber and resin reinforcement opposing the outer side with a planar surface; and adhering the outer side of the fiber and resin reinforcement to the structural member.

2. The method of manufacturing a reinforcement for a structural member of claim 1, further comprising:

wetting fibers with a resin capable of being cured by at least two different cure treatments;

at least partially curing the resin by subjecting the resin to a first cure treatment;

at least partially curing the resin by subjecting the resin to a second cure treatment.

3. A method of manufacturing a reinforcement according to claim 2, wherein at least one of the cure treatments is selected from the group consisting of subjecting the resin to light, an electron beam, a radio frequency and heat.

4. A method of manufacturing a reinforcement according to claim 2, wherein the first cure treatment includes subjecting the resin to UV light and wherein the second cure treatment includes subjecting the resin to heat.

5. A method of manufacturing a reinforcement according to claim 2, further comprising tensioning the fibers.

6. A method of manufacturing a reinforcement according to claim 2, further comprising longitudinally aligning the fibers.

7. A method of manufacturing a reinforcement according to claim 2, further comprising forming a layer from the fibers.

8. A method of manufacturing a reinforcement according to claim 2, further comprising adding a plurality of fibers adapted to provide cross-direction support for the reinforcement.

9. A method of manufacturing a reinforcement according to claim 2, wherein curing the resin is done while a side of the reinforcement is unconfined.

10. A method of manufacturing a reinforcement according to claim 2, further comprising selecting a synthetic fiber as the plurality of fibers.

11. A method of manufacturing a reinforcement according to claim 2, further comprising selecting a thermosetting plastic as the resin.

12. A method of manufacturing a reinforced structural member according to claim 1, further comprising tensioning the fibers.

13. A method of manufacturing a reinforced structural member according to claim 1, wherein the wetting coats all sides of the fibers with resin.

14. A method of manufacturing a reinforced structural member according to claim 1, wherein the locating further comprises placing the fibers into a layer.

15. A method of manufacturing a reinforced structural member according to claim 1, further comprising adding a layer of fibers adapted to provide cross-direction support for the fiber and resin reinforcement.

16. A method of manufacturing a reinforced structural member according to claim 1, wherein the locating forms the valleys with an elongated shape.

17. A method of manufacturing a reinforced structural member according to claim 1, wherein the curing further comprises subjecting the resin to at least two cure treatments.

18. A method of manufacturing a reinforced structural member according to claim 1, wherein curing the resin is done while a side of the reinforcement is unconfined.

19. A method of manufacturing a reinforced structural member comprising a fiber and resin reinforcement and a structural member, the method comprising:

wetting the fibers with a curable resin;

longitudinally aligning a plurality of fibers adjacent each other so that a plurality of valleys are formed between the plurality of fibers along an outer side of the reinforcement;

thereafter curing the resin to retain the valley in the outer side of the fiber and resin reinforcement and to provide a side of the fiber and resin reinforcement opposing the outer side with a planar surface; and adhering the outer side of the fiber and resin reinforcement to the structural member wherein the adhering includes applying an adhesive that penetrates completely through a thickness of the fiber and resin reinforcement.

20. A method of manufacturing a reinforced structural member according to claim 19, further comprising tensioning the plurality of fibers.

21. A method of manufacturing a reinforced structural member according to claim 19, further comprising adding a layer of fibers adapted to provide cross-direction support for the fiber and resin reinforcement prior to the curing.

22. A method of manufacturing a reinforced structural member according to claim 19, wherein the locating further comprises placing the fibers into a layer.

23. A method of manufacturing a reinforced structural member according to claim 19, wherein the curing further comprises subjecting the resin to at least two cure treatments.

24. A method of manufacturing a reinforced structural member according to claim 19, wherein curing the resin is done while a side of the reinforcement is unconfined.

* * * * *